Oct. 2, 1951  M. J. KUSS  2,570,033
ROOM HUMIDIFIER
Filed Sept. 12, 1949
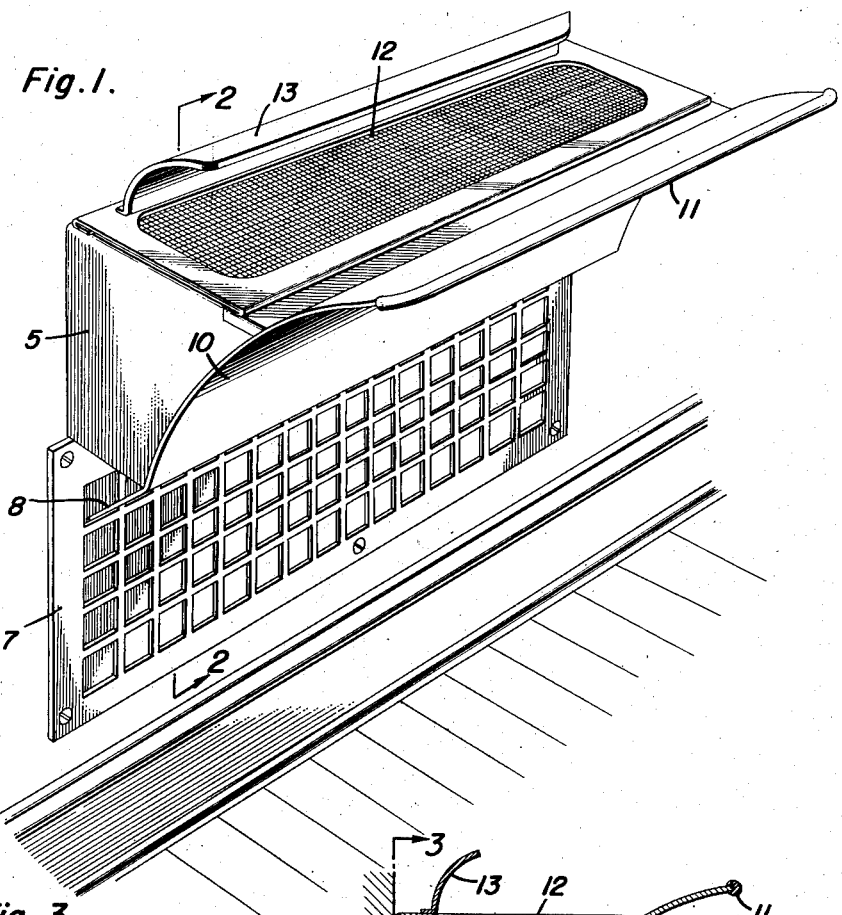
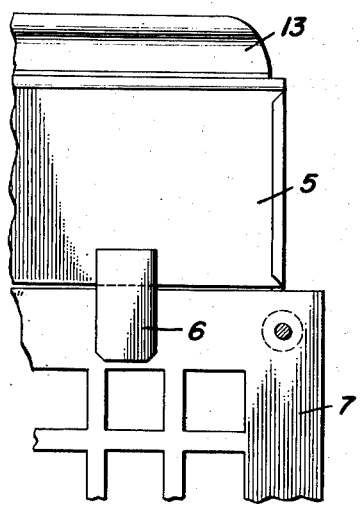
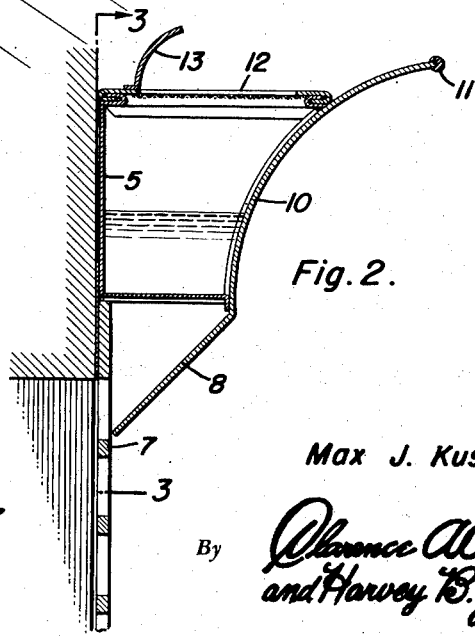
Inventor
Max J. Kuss Patented Oct. 2, 1951

2,570,033

UNITED STATES PATENT OFFICE 2,570,033

ROOM HUMIDIFIER

Max J. Kuss, Kent, Ohio

Application September 12, 1949, Serial No. 115,176

2 Claims. (Cl. 98—109)

The present invention relates to new and useful improvements in humidifiers for rooms and more particularly to a humidifier attachment for a hot air register.

An important object of the invention is to provide a pan or open tank with means for supporting the same at the upper edge of a wall register for heating and vaporizing the contents of the pan by heat from the register.

Another object is to form the outer surface of the pan with a curved deflector to increase the heating action of the contents of the pan and also to provide the top of the pan with a deflector to prevent damage to the finish of the wall adjacent the humidifier by vapor rising from the pan.

A further object is to provide a device of this character of simple and practical construction, which is efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a perspective view;

Figure 2 is a vertical sectional view taken on a line 2—2 of Figure 1; and,

Figure 3 is a fragmentary rear elevational view on a line 3—3 of Figure 2.

Referring now to the drawing in detail, wherein for the purpose of illustration I have disclosed a preferred embodiment of my invention, the numeral 5 designates a substantially rectangular shaped pan or open tank having one or more downwardly extending legs or lugs 6 at its lower rear edge engaged behind the upper edge of a hot air wall register 7 to support the pan against the wall above the register. Rearwardly inclined props 8 project downwardly from the front lower edge of pan 5 to brace the pan against the register.

The front wall 10 of the pan is curved outwardly to form an arcuate deflector which extends above the top of the pan and forwardly thereof with a beading 11 at its upper edge.

A screen cover 12 is slidably mounted on top of the pan to prevent objects from falling into the pan, and a forwardly curved deflector 13 rises from the rear edge of the cover.

In the use of the invention the pan 5 is placed in position at the upper edge of the wall register 7 and water or medicated liquid placed in the pan which becomes heated by hot air escaping from the register to thus vaporize the liquid which rises from the pan through the screen cover 12. Rear deflector 13 deflects the vapor from the wall.

Front deflector 10 deflects hot air from the register toward the center of the room to carry the vapor with it and the curved front wall forming front deflector 10 increases the heating area of the pan and retards a direct rising of hot air from the register for more effectively heating the pan.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A humidifier comprising a tank having an open top, attaching means on the tank for supporting the same in front of a wall above a hot air register, a sliding screen cover on the tank having a forwardly and upwardly curved deflector upstanding from the rear edge thereof to deflect vapor rising from the tank away from the wall, said tank having an upwardly curved concave front wall, and a forwardly and upwardly curved deflector rising above the tank from its front wall and forming a continuation of said wall.

2. A humidifier comprising a tank having an open top, attaching means on the tank for supporting the same in front of a wall above a hot air register, a sliding screen cover on the tank, a forwardly and upwardly curved deflector upstanding from the rear edge of the cover above the same, and a forwardly and upwardly curved deflector upstanding from the front of the tank.

MAX J. KUSS.

REFERENCES CITED

The following references are of record in the file of this patent:

UNITED STATES PATENTS

| Number | Name | Date |
|---|---|---|
| 907,195 | Stemmer | Dec. 22, 1908 |
| 1,325,438 | Desjardins | Dec. 16, 1919 |
| 1,581,243 | Stoeber | Apr. 20, 1926 |
| 1,668,042 | Bender | May 1, 1928 |
| 1,786,331 | Besch | Dec. 23, 1930 |
| 1,927,733 | Barton | Sept. 19, 1933 |